(12) United States Patent
Park et al.

(10) Patent No.: US 12,498,535 B2
(45) Date of Patent: Dec. 16, 2025

(54) CAMERA MODULE

(71) Applicant: SAMSUNG ELECTRO-MECHANICS CO., LTD., Suwon-si (KR)

(72) Inventors: Jaeman Park, Suwon-si (KR); Jungseok Lee, Suwon-si (KR); Sunghoon Kim, Suwon-si (KR); Byungwoo Kang, Suwon-si (KR); Sangjoon Kim, Suwon-si (KR); Doseop Hwang, Suwon-si (KR); Byung Gi An, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 442 days.

(21) Appl. No.: 18/092,506

(22) Filed: Jan. 3, 2023

(65) Prior Publication Data

US 2023/0236385 A1    Jul. 27, 2023

(30) Foreign Application Priority Data

Jan. 21, 2022  (KR) .................. 10-2022-0009046
Apr. 21, 2022  (KR) .................. 10-2022-0049736

(51) Int. Cl.
  *G02B 7/08*   (2021.01)
  *G02B 27/64*  (2006.01)
(52) U.S. Cl.
  CPC ............ *G02B 7/08* (2013.01); *G02B 27/646* (2013.01)
(58) Field of Classification Search
  CPC .............................................. G02B 7/02–105
  See application file for complete search history.

(56) References Cited

U.S. PATENT DOCUMENTS

2009/0067070 A1 *  3/2009  Mitani ............... G02B 7/02
                                                    359/824
2018/0224665 A1    8/2018  Im et al.
(Continued)

FOREIGN PATENT DOCUMENTS

CN    212009107 U  * 11/2020  ........... G02B 27/646
CN    113448053 A     9/2021
(Continued)

OTHER PUBLICATIONS

Machine translation of KR 2020-0073096 retrieved electronically from Espacenet May 13, 2025 (Year: 2025).*
(Continued)

*Primary Examiner* — Cara E Rakowski
(74) *Attorney, Agent, or Firm* — NSIP Law

(57) ABSTRACT

A camera module includes a carrier, disposed in an internal space of a housing, configured to receive a lens barrel, and having an external rolling portion corresponding to the internal rolling portion on an exterior side; a focus adjustment driver configured to generate a driving force to move the carrier in an optical-axis direction in the housing; and a rolling member disposed between the internal rolling portion and the external rolling portion. Either one or both of the internal rolling portion and the external rolling portion includes a guide groove, formed on an external surface of a mold forming an exterior of the housing or the carrier, including a pair of rolling sides facing each other with a predetermined angle, and a reinforcing insert made of a material having greater strength than a material of the mold.

18 Claims, 22 Drawing Sheets

(56) References Cited

U.S. PATENT DOCUMENTS

| | | | | |
|---|---|---|---|---|
| 2019/0271825 | A1* | 9/2019 | Kawanabe | ............... G02B 7/02 |
| 2021/0048728 | A1* | 2/2021 | Wu | .................... H02K 41/0356 |
| 2021/0302687 | A1* | 9/2021 | Jang | ......................... G02B 7/04 |
| 2021/0405321 | A1 | 12/2021 | Kwon et al. | |

FOREIGN PATENT DOCUMENTS

| | | |
|---|---|---|
| KR | 10-0847430 B1 | 7/2008 |
| KR | 10-0901162 B1 | 6/2009 |
| KR | 10-1538301 B1 | 7/2015 |
| KR | 10-1653247 B1 | 9/2016 |
| KR | 10-2020-0013020 A | 2/2020 |
| KR | 10-2020-0073096 A | 6/2020 |
| WO | WO 2015/133731 A1 | 9/2015 |

OTHER PUBLICATIONS

Korean Office Action issued on Nov. 15, 2024, in counterpart Korean Patent Application No. 10-2022-0049736 (2 pages in English, 3 pages in Korean).

Korean Office Action issued on Apr. 17, 2024, in counterpart Korean Patent Application No. 10-2022-0049736 (11 pages in English, 9 pages in Korean).

\* cited by examiner

CAMERA MODULE

CROSS-REFERENCE TO RELATED APPLICATION

This application claims the benefit under 35 USC 119(a) of Korean Patent Application No. 10-2022-0009046 filed in the Korean Intellectual Property Office on Jan. 21, 2022, and Korean Patent Application No. 10-2022-0049736 filed in the Korean Intellectual Property Office on Apr. 21, 2022, the entire disclosures of which are incorporated herein by reference for all purposes.

BACKGROUND

1. Field

The present disclosure relates to a camera module.

2. Description of the Related Art

As information communication and semiconductor techniques rapidly develop, the supply and use of electronic devices are steeply increasing. Electronic devices do not merely remain in their traditional territory but converge various functions and provide the converged ones.

Recently, cameras have been adopted in portable electronic devices such as smartphones, tablet PCs, or laptop computers. In addition, portable electronic devices may add an autofocus (AF) function, an optical image stabilizer (OIS) function, and a zoom function.

The optical image stabilization function may include camera shaking correction and hand shaking correction, and it may prevent images of subjects photographed when hand shaking or camera shaking that is undesired by a photographer is generated while the camera is moving or stopped from being vibrated.

The autofocus function allows for acquiring clear images on an imaging plane of an image sensor by moving a lens positioned at the front of the image sensor in the optical axis direction depending on the distance from the subject.

As the cameras that are portable electronic devices gradually support high performance, high-magnification lenses and high-capacity actuators are introduced. As the weights of components increase and the components are exposed to environments such as vibration in real-life conditions, the deformation may be frequently generated by impacts among the components. Therefore, it may be desirable to strengthen components in preparation for the performance realization of high magnification and high capacity.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a camera module includes a housing having an internal space covered by a cover, and an internal rolling portion on an internal side; a carrier, disposed in the internal space of the housing, configured to receive a lens barrel, and having an external rolling portion corresponding to the internal rolling portion on an exterior side; a focus adjustment driver configured to generate a driving force to move the carrier in an optical-axis direction in the housing; and a rolling member disposed between the internal rolling portion and the external rolling portion. Either one or both of the internal rolling portion and the external rolling portion includes a guide groove, formed on an outside of a mold forming an exterior of the housing or the carrier, including a pair of rolling sides facing each other with a predetermined angle, and a reinforcing insert made of a material having greater strength than a material of the mold and formed to have a plurality of rails distributed on the one pair of rolling sides in the guide groove.

The material of the mold may be a resin material, and the material of the reinforcing insert may be a metallic material.

The rails may extend in parallel to each other in the optical-axis direction in the guide groove.

The rails may be exposed in the guide groove.

The reinforcing insert may include a connector for connecting the rails to each other.

The connector may be configured to insert into the mold of the housing or a mold of the carrier and is bent along a curve of the guide groove.

The reinforcing insert further may include a bridge bent to intersect the optical-axis direction from at least one end of the rails.

The reinforcing insert may further include a protrusion configured to protrude from the rails to a lateral side and insert into the mold of the carrier.

In another general aspect, a camera module include a housing having an internal space covered by a cover, and an upper rolling portion on an internal upper side; a folded module including a reflective member configured to change a path of incident light by reflection; a lens module, disposed in the internal space of the housing, including a plurality of lenses arranged in an optical-axis direction to allow light reflected at the reflective member to pass therethrough, and including a lens barrel having a lower rolling portion corresponding to the upper rolling portion on an external lower side; a focus adjustment driver configured to generate a driving force to move the lens module in the optical-axis direction in the housing; and a rolling member disposed between the upper rolling portion and the lower rolling portion. Either one or both of the upper rolling portion and the lower rolling portion includes a guide groove, formed on an external side of a mold forming an exterior of the housing or the lens module, including a pair of rolling sides facing each other with a predetermined angle, and a reinforcing insert made of a material having greater strength than a material of the mold and including a plurality of rails distributed on the one pair of rolling sides in the guide groove.

The material of the mold may be a resin material, and the material of the reinforcing insert may be a metallic material.

The rails may extend in parallel to each other in the optical-axis direction in the guide groove.

The rails may be exposed in the guide groove.

The reinforcing insert may include a connector configured to connect the rails to each other on at least one end.

The connector may be configured to insert into the mold of the housing or a mold of the lens module and may be bent along a curve of the guide groove.

In another general aspect, a camera module include a housing having an internal space covered by a cover, and an internal rolling portion on an internal side; a carrier disposed in an internal space of the housing, configured to receive a lens barrel, and having an external rolling portion that corresponds to the internal rolling portion on an exterior side; a focus adjustment driver configured to generate a driving force to move the carrier in an optical-axis direction in the housing; and a rolling member disposed between the internal rolling portion and the external rolling portion. The external rolling portion includes a guide groove formed on an external surface of a mold forming an exterior of the carrier, and a reinforcing insert made of a material having greater strength than a material of the mold, and the external rolling portion is installed in the mold to correspond to the guide groove.

The material of the mold may be a resin material, and the material of the reinforcing insert may be a metallic material.

The camera module may further include a yoke disposed on one side wall of the carrier on which the external rolling portion is disposed, extending along the one side wall in a direction perpendicular to the optical axis and installed in the mold. The reinforcing insert may integrally extend from at least one end of the yoke.

The reinforcing insert may be bent along a transactional contour of the guide groove incised with respect to a plane perpendicular to the optical axis from the at least one end of the yoke.

Other features and aspects will be apparent from the following detailed description, the drawings, and the claims.

BRIEF DESCRIPTION OF THE DRAWINGS

Throughout the drawings and the detailed description, the same reference numerals refer to the same or like elements. The drawings may not be to scale, and the relative size, proportions, and depiction of elements in the drawings may be exaggerated for clarity, illustration, and convenience.

DETAILED DESCRIPTION

Figure 1:
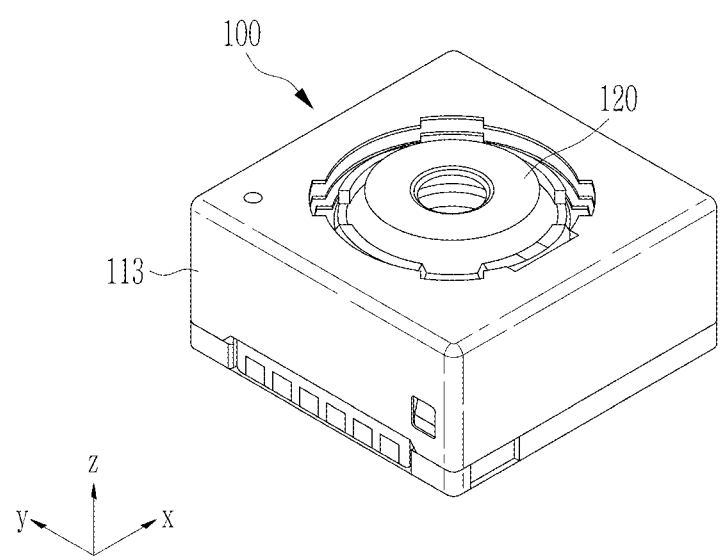
FIG. 1 shows a perspective view of a camera module according to an embodiment.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known after understanding of the disclosure of this application may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

As used herein, the term "and/or" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Spatially relative terms such as "above," "upper," "below," and "lower" may be used herein for ease of description to describe one element's relationship to another element as shown in the figures. Such spatially relative terms are intended to encompass different orientations of the device in use or operation in addition to the orientation depicted in the figures. For example, if the device in the figures is turned over, an element described as being "above" or "upper" relative to another element will then be "below" or "lower" relative to the other element. Thus, the term "above" encompasses both the above and below orientations depending on the spatial orientation of the device. The device may also be oriented in other ways (for example, rotated 90 degrees or at other orientations), and the spatially relative terms used herein are to be interpreted accordingly.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Due to manufacturing techniques and/or tolerances, variations of the shapes shown in the drawings may occur. Thus, the examples described herein are not limited to the specific shapes shown in the drawings, but include changes in shape that occur during manufacturing.

The features of the examples described herein may be combined in various ways as will be apparent after an understanding of the disclosure of this application. Further, although the examples described herein have a variety of configurations, other configurations are possible as will be apparent after an understanding of the disclosure of this application.

The phrase "in a plan view" or "on a plane" means viewing a target portion from the top, and the phrase "in a cross-sectional view" or "on a cross-section" means viewing a cross-section formed by perpendicularly cutting a target portion from the side.

Throughout the specification, when it is described that a part is "connected" to another part, the part may be "directly connected" to the other element, may be "connected" to the other part through a third part, or may be connected to the other part physically or electrically, and may be referred to by different titles depending on positions or functions, but respective portions that are substantially integrated into one body may be connected to each other.

The present disclosure is directed to a camera module configured to maintain driving performance by smoothly realizing an autofocus function and an optical image stabilization function, and having high impact-resistance.

Figure 2:
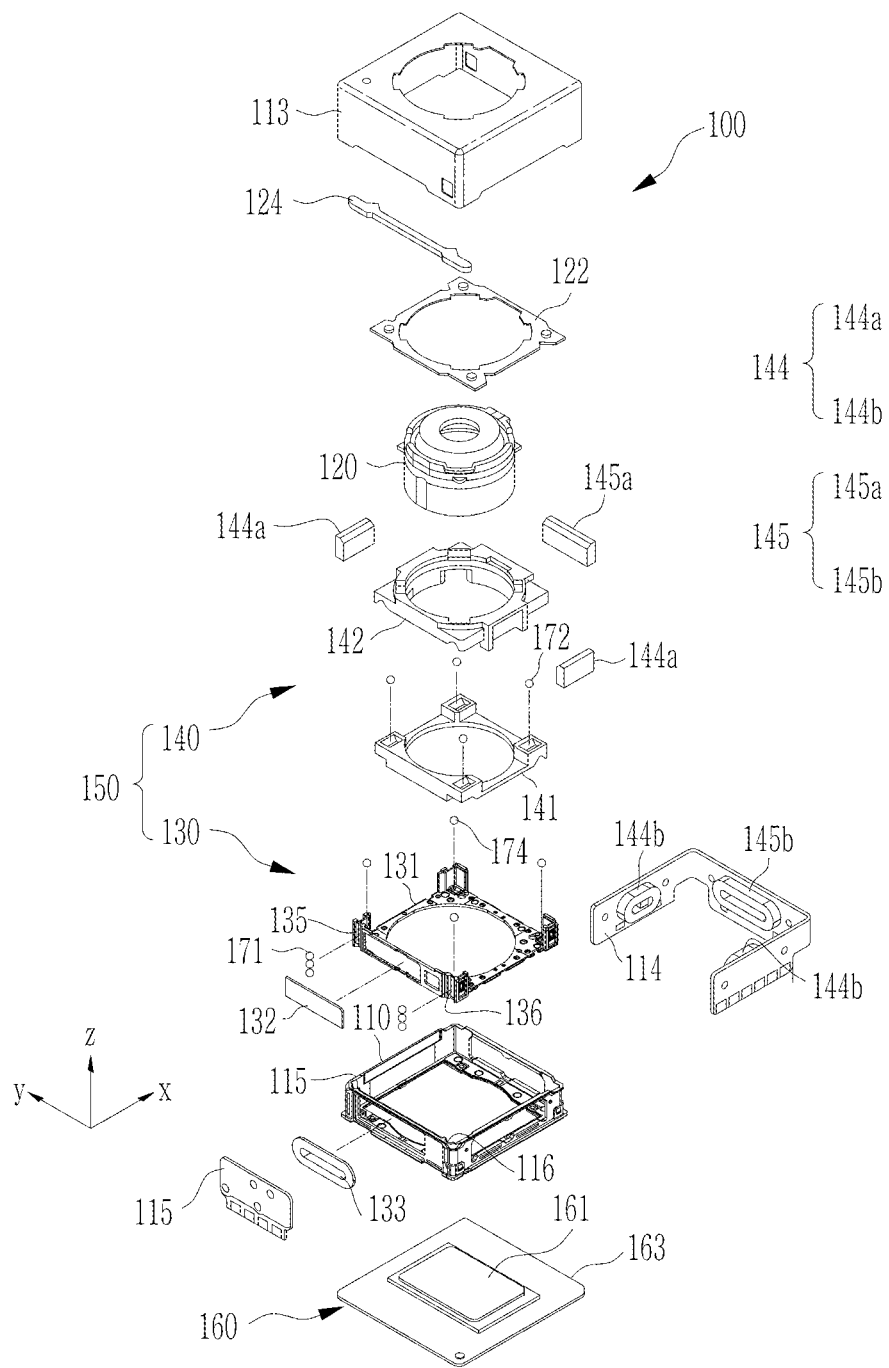
FIG. 2 shows an exploded perspective view of a camera module shown in FIG. 1.

FIG. 1 shows a perspective view of a camera module according to an embodiment, and FIG. 2 shows an exploded perspective view of a camera module shown in FIG. 1.

Referring to FIG. 1 and FIG. 2, the camera module 100, according to the present embodiment, includes a lens barrel 120, a lens driving device 150 for moving the lens barrel 120, an image sensor unit 160 for converting light input through the lens barrel 120 into electric signals, a housing 110 for receiving the lens barrel 120 and the lens driving device 150, and a cover 113.

The lens barrel 120 may have a hollow space in a cylindrical shape for receiving a plurality of lenses for photographing a subject into the lens barrel 120, and the lenses are mounted in the lens barrel 120 along an optical axis. A required number of lenses may be disposed according to the design of the lens barrel 120, and the respective lenses may have optical characteristics such as identical or different refractive indexes. The optical axis may be set to be the z-axis in the drawing.

The lens driving device 150 moves the lens barrel 120, and includes a focus adjustment unit 130 for adjusting focuses and a stabilization unit 140 for correcting hand trembling or shakes.

For example, the lens driving device 150 may use the focus adjustment unit 130 and may move the lens barrel 120 in an optical axis direction (i.e., the z-axis direction in the drawing) to adjust the focus, and it may use the stabilization unit 140 and may move the lens barrel 120 in a direction (i.e., an x-axis or y-axis direction in the drawing) that is perpendicular to the optical axis direction to correct the shakes at the time of photographing.

The focus adjustment unit 130 includes a carrier 131 for receiving the lens barrel 120 and a focus adjustment driver for generating a driving force for moving the lens barrel 120 and the carrier 231 in the optical axis direction. The focus adjustment driver includes a focus adjustment magnet 132 and a focus adjustment coil 133.

When a power voltage is applied to the focus adjustment coil 133, the carrier 131 may be moved in the optical axis direction by an electromagnetic influence force between the focus adjustment magnet 132 and the focus adjustment coil 133. As the carrier 131 receives the lens barrel 120, the lens barrel 120 may also move in the optical axis direction by the movement of the carrier 131, and the focus may be adjusted.

For example, the focus adjustment magnet 132 may be installed on one side of the carrier 131, and the focus adjustment coil 133 may be installed on the housing 110 with the substrate 114 as a medium. Here, the focus adjustment magnet 132 is a moving member that is mounted on the carrier 131 and moves in the optical axis direction together with the carrier 131, and the focus adjustment coil 133 is a fixing member that is fixed to the housing 110. Without being limited thereto, positions of the focus adjustment magnet 132 and the focus adjustment coil 133 are exchangeable with each other.

When the carrier 131 moves, internal rolling portions 115 and 116 and external rolling portions 135 and 136 may be formed on the housing 110 and the carrier 131 so as to reduce friction between the carrier 131 and the housing 110. That is, the internal rolling portions 115 and 116 may be formed on an inner side of the housing 110, the external rolling portions 135 and 136 may be formed on an exterior side of the carrier 131, and the internal rolling portions 115 and 116 may be disposed to correspond to the external rolling portions 135 and 136.

A rolling member 171 may be disposed between the internal rolling portions 115 and 116 and the external rolling portions 135 and 136 to guide a movement of the carrier 131 in the optical-axis direction. The rolling member 171 may, for example, have a ball shape, and a plurality of balls may be arranged and disposed in the optical-axis direction between the internal rolling portions 115 and 116 and the external rolling portions 135 and 136.

The stabilization unit 240 corrects the blurring of images or shaking of videos by factors such as the vibration of a user's hand when the images or the videos are photographed. For example, when the images are shaken while the user's hand shakes while photographing, the stabilization unit 140 compensates the shaking by providing a relative displacement corresponding to the shaking to the lens barrel 120.

The stabilization unit 140 includes a guide member for guiding the movement of the lens barrel 120, and a stabilization driver for generating a driving force for moving the guide member in a direction that is perpendicular to the optical axis direction. The guide member includes a guide frame 141 and a lens holder 142. The guide frame 141 and the lens holder 142 are inserted into the carrier 131 and disposed in the optical axis direction, guiding the lens barrel 120.

The stabilization driver includes a first stabilization driver 144 and a second stabilization driver 145, and the first and second stabilization drivers 144 and 145 include stabilization magnets 144a and 145a and stabilization coils 144b and 145b.

The first stabilization driver 144 generates a driving force in the first axis direction (the x-axis direction in the drawing) that is perpendicular to the optical axis direction, and the second stabilization driver 145 generates a driving force in the second axis direction (the y-axis direction in the drawing) that is perpendicular to the first axis direction. The second axis (y-axis) is perpendicular to the optical axis (z-axis) and the first axis (x-axis).

A plurality of rolling members 172 and 174 in a ball shape are provided to support the stabilization unit 140. The rolling members 172 and 174 guide the lens holder 142 and the guide frame 141 in a stabilization process. They also maintain gaps among the carrier 131, the guide frame 141, and the lens holder 142.

The image sensor unit 160 converts light input through the lens barrel 120 into electrical signals. For example, the image sensor unit 160 may include an image sensor and a flexible printed circuit (FPC) connected thereto, and may further include an infrared ray filter. The infrared ray filter blocks the light of an infrared ray region from among the light input through the lens barrel 120.

The lens barrel 120 and the lens driving device 150 are received in an internal space of the housing 110, and for example, the housing 110 may have a box shape of which an upper portion and a lower portion are opened. The image sensor unit 160 is disposed on the lower portion of the housing 110.

A stopper 122 may be further disposed on an upper portion of the lens barrel 120 to prevent the guide frame 141 and the lens holder 142 from leaving the internal space of the carrier 131, and the stopper 122 may be combined with the carrier 131. A ball stopper 124 may be installed in the carrier 131 to cover the external rolling portions 135 and 136 of the carrier 131. The rolling member 171 received in the external rolling portions 135 and 136 of the carrier 131 may be blocked from leaving by the ball stopper 124.

The cover 113 is combined to the housing 110 to surround the housing 110, and protects inner components of the camera module. The cover 113 may shield electromagnetic waves. For example, the cover 113 may shield the electromagnetic waves so that the electromagnetic waves generated by the camera module may not influence other electronic parts in the portable electronic device.

Figure 3:
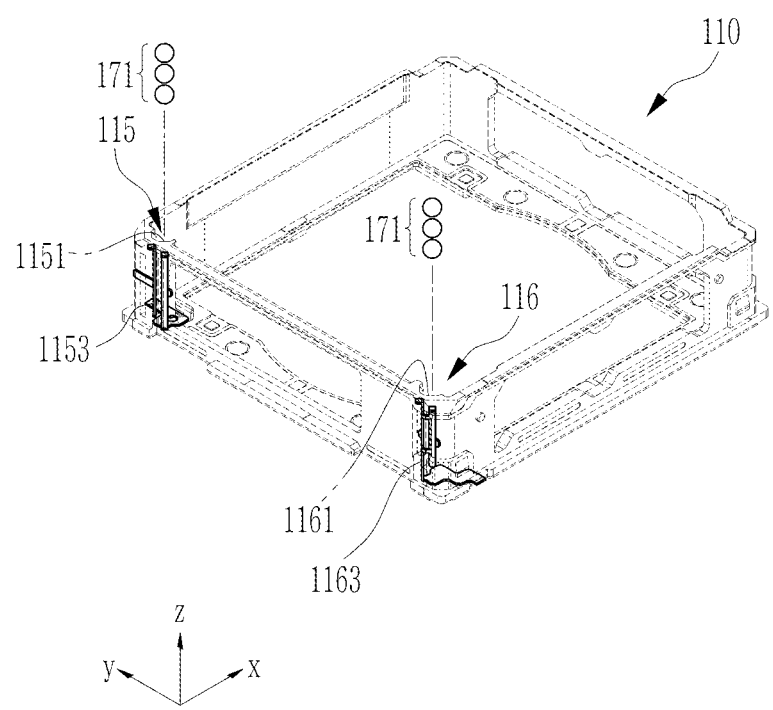
FIG. 3 shows a perspective view of a housing of a camera module shown in FIG. 2.
Figure 4:
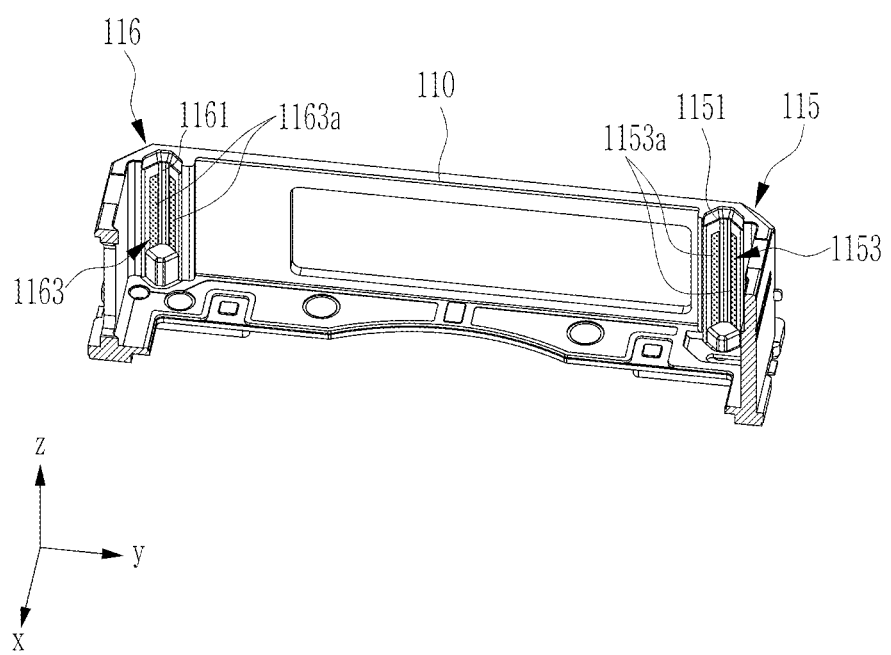
FIG. 4 shows a partially-cut perspective view of part of a housing shown in FIG. 3.
Figure 5:
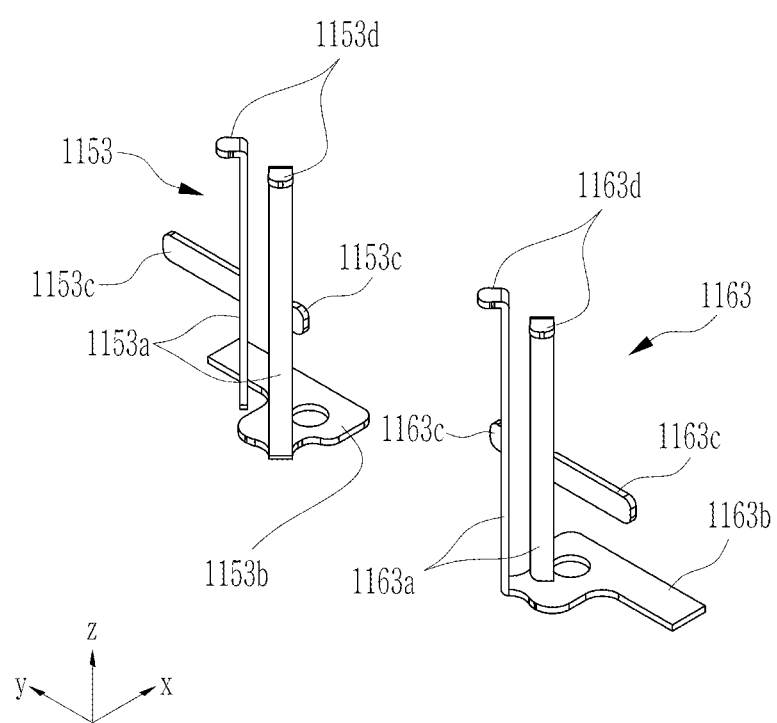
FIG. 5 shows a perspective view of an extracted reinforcing insert shown in FIG. 3.

FIG. 3 shows a perspective view of a housing of a camera module shown in FIG. 2, FIG. 4 shows a partially-cut perspective view of part of a housing shown in FIG. 3, and FIG. 5 shows a perspective view of an extracted reinforcing insert shown in FIG. 3.

Referring to FIG. 3 and FIG. 4, the housing 110 of the camera module 100, according to the present embodiment, may include internal rolling portions 115 and 116 formed on the inner side of one side wall. One pair of the internal rolling portions 115 and 116 may be disposed on respective sides with respect to a center of a width direction (y-axis direction) of the one side wall. The one side wall may be a side wall of the housing 110 in which the focus adjustment coil 133 or the focus adjustment magnet 132 is disposed.

The internal rolling portions 115 and 116 may include guide grooves 1151 and 1161 formed outside of the mold, forming an exterior of the housing 110. The guide grooves 1151 and 1161 may extend in the optical-axis direction (z-axis direction) and receive the rolling member 171 (refer to FIG. 2), and may guide the motion of the rolling member 171 in the optical-axis direction.

The internal rolling portions 115 and 116 may include reinforcing inserts 1153 and 1163 formed to have rails 1153a and 1163a spaced from each other in the guide grooves 1151 and 1161. The reinforcing inserts 1153 and 1163 may be made of a material that has greater strength than the mold, for example, the mold may be made of a resin material and the reinforcing insert may be made of a metallic material.

Referring to FIG. 4, the rails 1153a and 1163a of the reinforcing inserts 1153 and 1163 may extend in parallel to the optical-axis direction in the respective guide grooves 1151 and 1161, and may be formed to be exposed in the guide grooves 1151 and 1161. The guide grooves 1151 and 1161 may include a pair of rolling sides facing each other with a predetermined angle, and the respective rails 1153a and 1163a may be distributed and disposed on the one pair of rolling sides.

Therefore, the rolling member 171 in a ball shape contacts the rails 1153a and 1163a of the reinforcing inserts 1153 and 1163 and rolls along the same in the guide grooves 1151 and 1161 of the internal rolling portions 115 and 116. The rolling member 171 may be made of a metal ball, and as it faces the reinforcing inserts 1153 and 1163 of a metallic material and contacts the same in the guide grooves 1151 and 1161, the imprinting phenomenon of the guide grooves 1151 and 1161 by the rolling member 171 may be prevented.

Referring to FIG. 5, the reinforcing inserts 1153 and 1163 may include bridges 1153b and 1163b bent in a direction that crosses the optical-axis direction from at least one end of the rails 1153a and 1163a. The bridges 1153b and 1163b may firmly fix the reinforcing inserts 1153 and 1163, exposing the rails 1153a and 1163a in the guide grooves 1151 and 1161, into the mold of the housing 110. That is, in the insert molding process, the bridges 1153b and 1163b may function as knobs for supporting the reinforcing inserts 1153 and 1163, and when the mold formation is completed, portions of the bridges 1153b and 1163b exposed outside may be incised and removed.

The reinforcing inserts 1153 and 1163 may include protrusions 1153c, 1153d, 1163c, and 1163d protruding to a lateral side from the rails 1153a and 1163a and inserted into the mold of the housing 110. The protrusions 1153c, 1153d, 1163c, and 1163d may protrude to be perpendicular to an elongation direction of the rails 1153a and 1163a from middle ends or terminal ends of the respective rails 1153a and 1163a. The protrusions 1153c, 1153d, 1163c, and 1163d may also firmly fix the reinforcing inserts 1153 and 1163 exposing the rails 1153a and 1163a in the guide grooves 1151 and 1161, into the mold of the housing 110.

Figure 6:
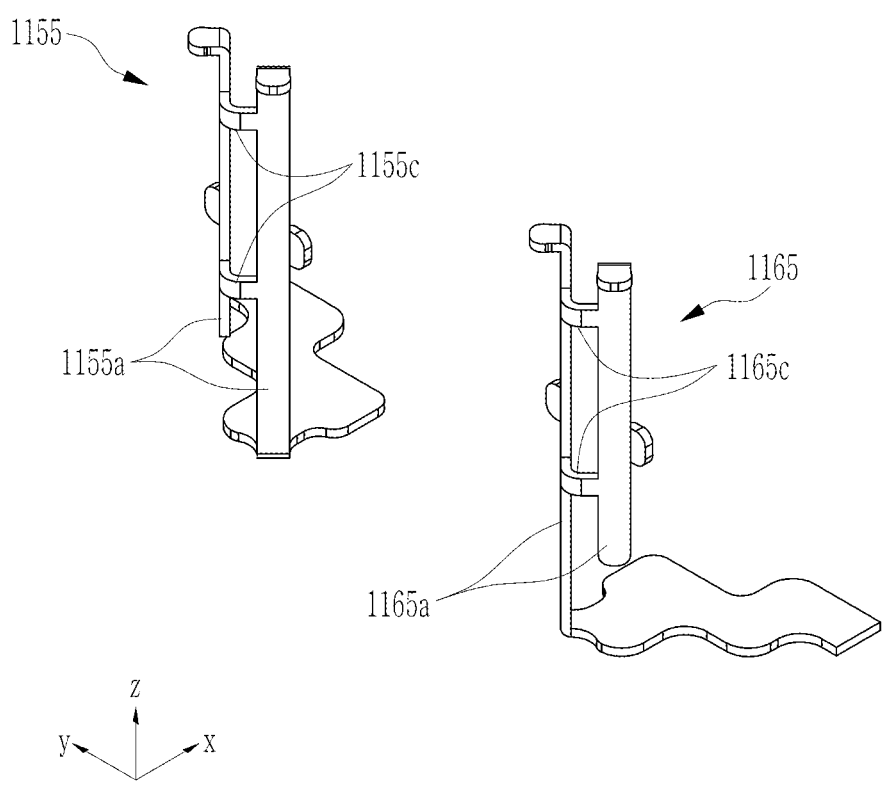
FIG. 6 shows a perspective view of a reinforcing insert according to another variation of a ball rolling portion applied to a housing of a camera module shown in FIG. 2.

FIG. 6 shows a perspective view of a reinforcing insert according to another variation of a ball rolling portion applied to a housing of a camera module shown in FIG. 2.

Referring to FIG. 6, the reinforcing inserts 1155 and 1165 according to the present variation may include a plurality of rails 1155a and 1165a extending in parallel to each other, and connectors 1155c and 1165c for connecting the rails 1155a and 1165a. The connectors 1155c and 1165c may be multiple, and may be disposed to be spaced from each other in the middle of the rails 1155a and 1165a. The connectors 1155c and 1165c may be inserted into the mold of the housing 110 and may be bent along curves of the guide grooves 1151 and 1161.

Figure 7:
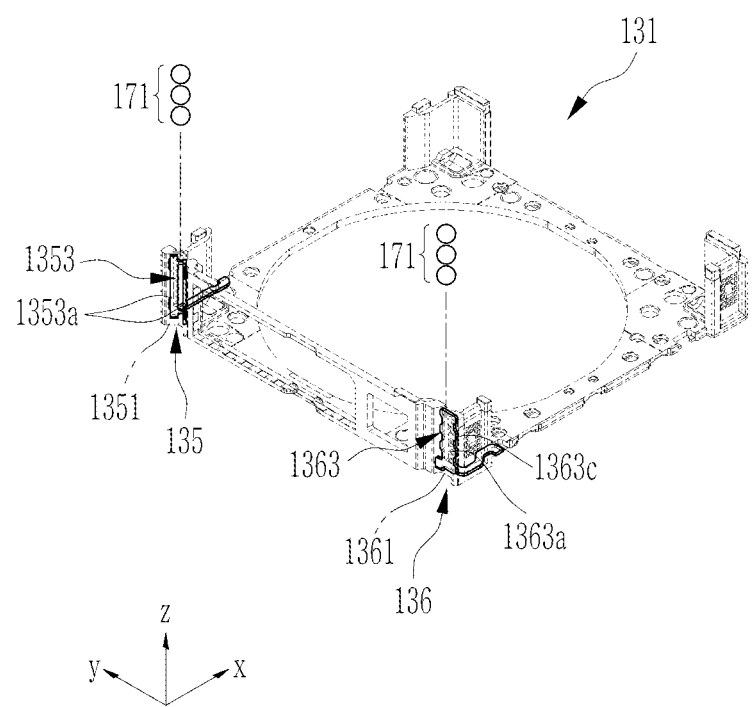
FIG. 7 shows a perspective view of a carrier of a camera module shown in FIG. 2.
Figure 8:
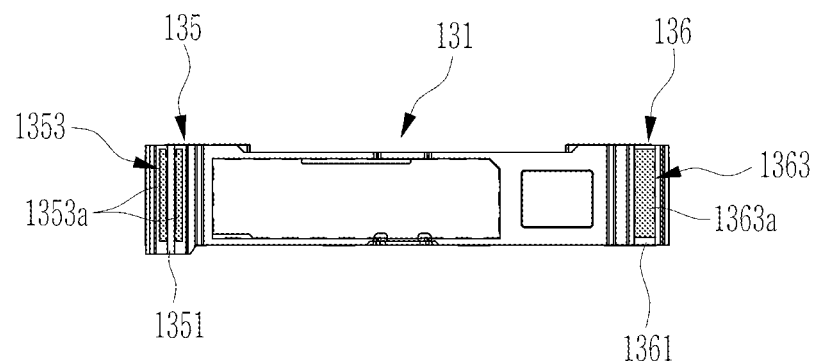
FIG. 8 shows a front view of a carrier shown in FIG. 7.
Figure 8:
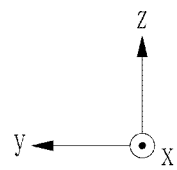
Figure 9:
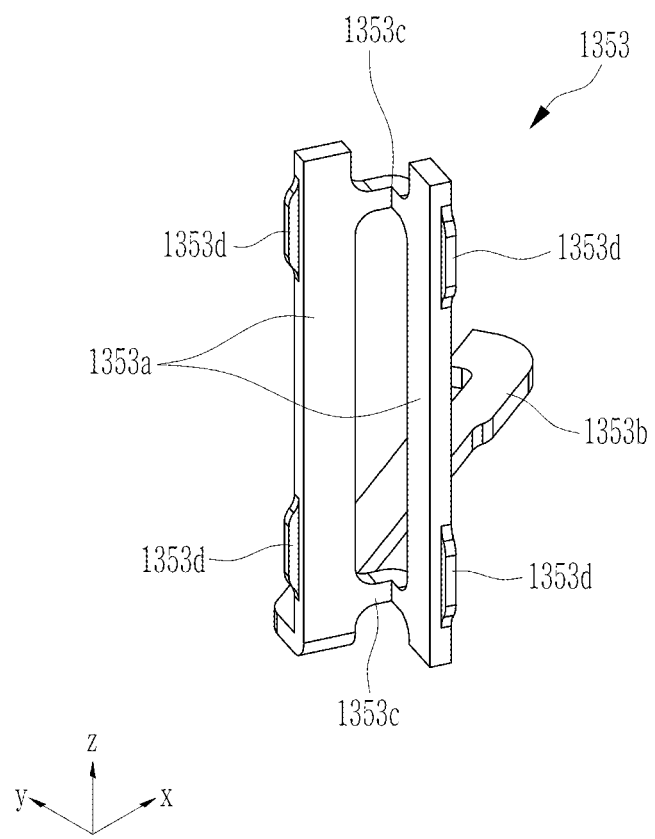
FIG. 9 shows a perspective view of an extracted reinforcing insert shown in FIG. 7.

FIG. 7 shows a perspective view of a carrier of a camera module shown in FIG. 2, FIG. 8 shows a front view of a carrier shown in FIG. 7, and FIG. 9 shows a perspective view of an extracted reinforcing insert shown in FIG. 7.

Referring to FIG. 7 and FIG. 8, the carrier 131 of the camera module 100, according to the present embodiment, may include external rolling portions 135 and 136 formed on an exterior side of the side wall. One pair of the external rolling portions 135 and 136 may be disposed on respective sides with respect to the center of the width direction (y-axis direction) of the one side wall. The one side wall may be a side wall of the carrier 131 on which the focus adjustment coil 133 or the focus adjustment magnet 132 is disposed.

The external rolling portions 135 and 136 may include guide grooves 1351 and 1361 formed on the outside of the mold forming the exterior of the carrier 131. The guide grooves 1351 and 1361 may extend in the optical-axis direction (z-axis direction), may receive the rolling member 171, and may guide the motion of the rolling member 171 in the optical-axis direction.

The external rolling portions 135 and 136 disposed on the carrier 131 may include a first external rolling portion 135 at which the rolling member 171 in a ball shape contacts at two points in the guide groove 1351 and a second external rolling portion 136 at which the same contact occurs at one point in the guide groove 1361. That is, the guide groove 1351 of the first external rolling portion 135 may include a pair of V-type rolling sides facing each other at a predetermined angle and respectively contacting the rolling member 171, and the guide groove 1361 of the second external rolling portion 136 may include a planar rolling side contacting the rolling member 171.

The first external rolling portion 135 may include a reinforcing insert 1353 formed to have a plurality of rails 1353a spaced from each other in the guide groove 1351, and the second external rolling portion 136 may include a reinforcing insert 1363 having a single planar rail 1363a in the guide groove 1361. The reinforcing inserts 1353 and 1363 may be made of a material that has greater strength than the mold, for example, the mold may be made of a resin material and the reinforcing insert may be made of a metallic material.

Referring to FIG. 7 and FIG. 8, the rails 1353a of the reinforcing insert 1353 disposed on the first external rolling portion 135 may extend in parallel in the optical-axis direction in the guide groove 1351, and may be exposed in the guide groove 1351. The respective rails 1353a may be distributed on a pair of rolling sides facing each other.

Therefore, the rolling member 171 in a ball shape contacts the rails 1353a and 1363a of the reinforcing inserts 1353 and 1363 and may roll along the rails in the guide grooves 1351 and 1361 of the first and second external rolling portions 135 and 136. The rolling member 171 may be made of a metal ball, and may face the reinforcing inserts 1353 and 1363 of a metallic material and may contact them in the guide grooves 1351 and 1361, thereby preventing the guide grooves 1351 and 1361 from imprinting by the rolling member 171.

Referring to FIG. 9, the reinforcing insert 1353 of the first external rolling portion 135 may include a bridge 1353b bent to cross the optical-axis direction from at least one end of the rails 1353a. The bridge 1353b may firmly fix the reinforcing insert 1353 exposing the rail 1353a in the guide groove 1351 into the mold of the carrier 131. That is, in the insert molding process, the bridge 1353b may function as a knob for supporting the reinforcing insert 1353, and when the mold formation is completed, a portion of the bridge 1353b exposed to the outside may be incised and removed.

The reinforcing insert 1353 may include a connector 1353c for connecting a plurality of rails 1353a extending in parallel to each other. The connector 1353c may be multiple, and they may be spaced from each other in the middle of the rail 1353a. The connector 1353c may be inserted into the mold of the carrier 131, and may be bent along curves of the guide groove 1351.

The reinforcing insert 1353 may include a protrusion 1353d protruding to a lateral side from the rail 1353a and inserted into the mold of the carrier 131. The protrusion 1353d may protrude to be perpendicular to an elongation direction of the rail 1353a from middle ends or terminal ends of the respective rails 1353a. The protrusion 1353d may also firmly fix the reinforcing insert 1353 exposing the rail 1353a in the guide groove 1351, into the mold of the carrier 131.

Similarly, referring to FIG. 7, the reinforcing insert 1363 of the second external rolling portion 136 may include a protrusion 1363c protruding to a lateral side from the rail 1363a and inserted into the mold of the carrier 131. The protrusion 1363c may protrude to be perpendicular to the elongation direction of the rail 1363a from a middle end or a terminal end of the rail 1363a, and may firmly fix the reinforcing insert 1363, exposing the rail 1363a in the guide groove 1361 into the mold of the carrier 131.

Figure 10:
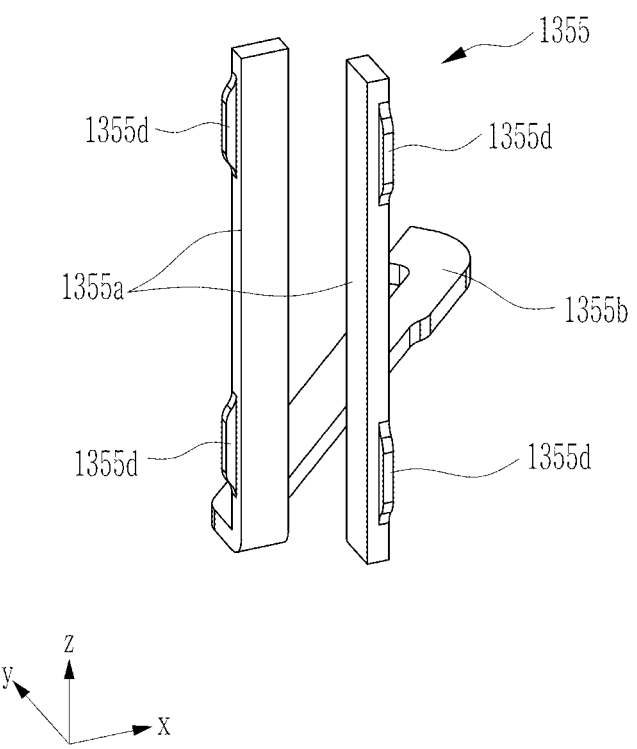
FIG. 10 shows a perspective view of a reinforcing insert according to another variation of a ball rolling portion applied to a carrier of a camera module shown in FIG. 2.

FIG. 10 shows a perspective view of a reinforcing insert according to another variation of a ball rolling portion applied to a carrier of a camera module shown in FIG. 2.

Referring to FIG. 10, the reinforcing insert 1355, according to the present variation, includes a plurality of rails 1355a extending in parallel to each other and not connected to each other. The reinforcing insert 1355 includes a bridge 1355b bent to cross the optical-axis direction from at least one end of a plurality of rails 1355a, and may include a protrusion 1355d protruding to a lateral side from the rail 1355a and inserted into the mold of the carrier 131. Hence, when the respective rails 1355a are not connected to each other by the carrier 131, they may be firmly fixed into the mold by using the bridge 1355b and the protrusion 1355d.

Figure 11:
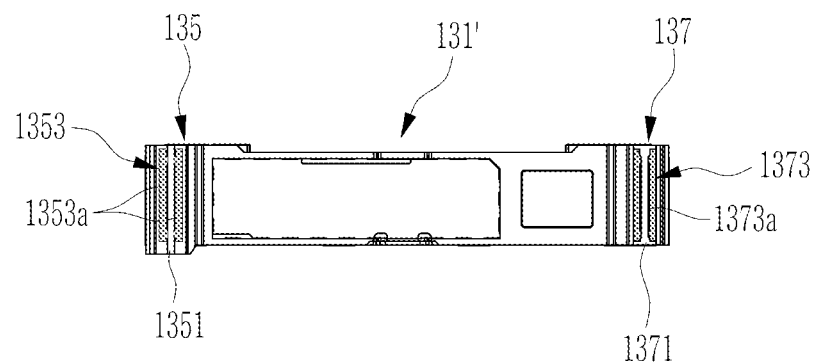
FIG. 11 shows a front view of a variation of a carrier of a camera module shown in FIG. 2.

FIG. 11 shows a front view of a variation of a carrier of a camera module shown in FIG. 2.

Referring to FIG. 11, the external rolling portions 135 and 137 disposed on a carrier 131' according to a variation may include first and second external rolling portions 135 and 137 that a rolling member 171 in a ball shape contacts at two points in the guide grooves 1351 and 1371. That is, guide grooves 1351 and 1361 of the first external rolling portion 135 and the second external rolling portion 137 may include a pair of V-type rolling sides facing each other with a predetermined angle and respectively contacting the rolling member 171.

In this instance, the first and second external rolling portions 135 and 137 may include reinforcing inserts 1353 and 1373 formed to have a plurality of rails 1353a and 1373a spaced from each other in the guide grooves 1351 and 1371. The reinforcing inserts 1353 and 1373 may be made of a material that has greater strength than the mold, for example, the mold may be made of a resin material and the reinforcing insert may be made of a metallic material.

Figure 12:
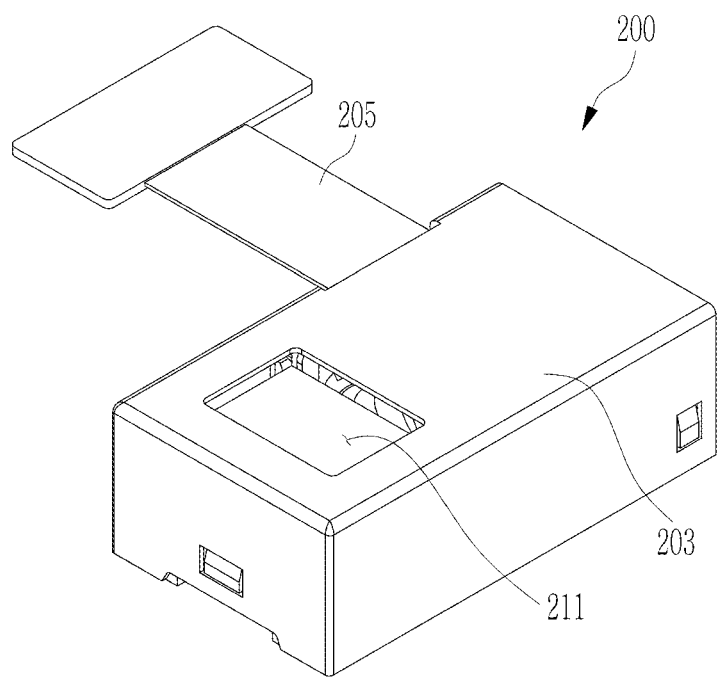
FIG. 12 shows a perspective view of a camera module according to another embodiment.
Figure 13:
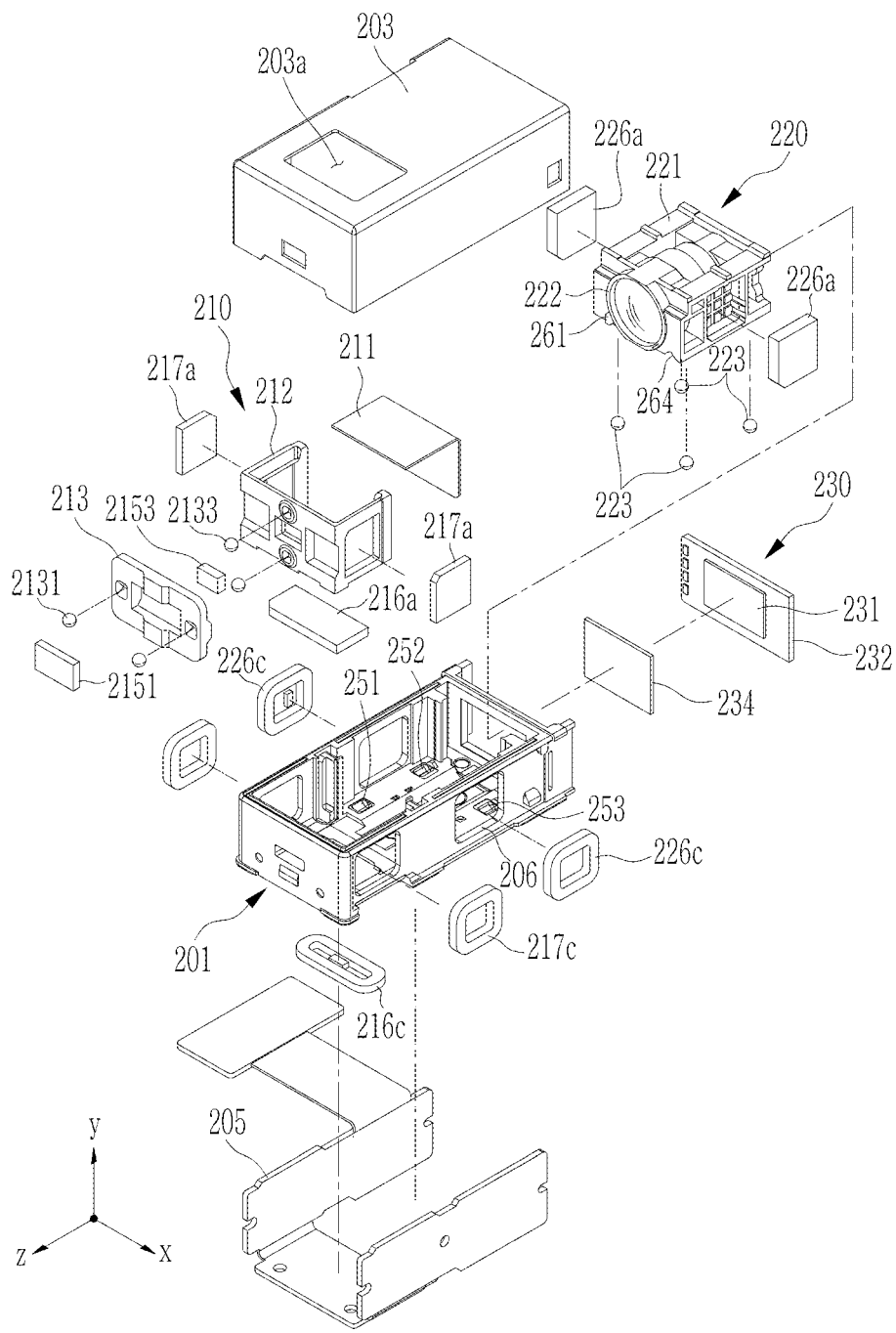
FIG. 13 shows an exploded perspective view of a camera module shown in FIG. 12.

FIG. 12 shows a perspective view of a camera module according to another embodiment, and FIG. 13 shows an exploded perspective view of a camera module shown in FIG. 12.

Referring to FIG. 12 and FIG. 13, the camera module 200 may include a folded module 210, a lens module 220, and an image sensor module 230. The folded module 210 and the lens module 220 are received in the housing 201. The cover 203 surrounds part of the upper portion and the lateral side of the housing 201 and configures a part of the exterior of the camera module 200. The cover 203 in this instance may be a shield can.

The folded module 210 may change the direction of light input from the outside. The light input into the camera through the opening 203a of the cover 203 may be reflected toward the lens module 220 by the folded module 210.

The folded module 210 may include a movable holder 212 in which a reflective member 211 is installed, and the reflective member 211 may be provided as a prism or a mirror. The movable holder 212 may be closely attached to and supported on an interior wall side of the housing 201 by the gravitation of a pulling yoke 2151 installed on an interior wall side of the housing 201 and a pulling magnet 2153 installed on the movable holder 212. A first ball bearing 2131, a rotating plate 213, and a second ball bearing 2133 may be installed between the interior wall side of the housing 201 and the movable holder 212 so the movable holder 212 may flow in the housing 201.

The lens module 220 includes a carrier 221 installed to be moveable in the optical-axis direction (z-axis direction in the drawing) in an internal space of the housing 201, and a lens barrel 222 fixed to the carrier 221 and including at least one lens. The light reflected from the folded module 210 passes through the lens module 220 and is refracted. The light passing through the lens module 220 is input to the image sensor 231. When the lens module includes a plurality of lenses, the lenses are arranged in the optical-axis direction.

The image sensor module 230 may include an image sensor 231, and a substrate 232 on which the image sensor 231 is mounted. An image falls on an imaging plane (or an image side) of the image sensor 231, and in response to this, the image sensor 231 generates an image signal of the fallen image, and the image signal may be transmitted to an external circuit through the substrate 232. The image sensor module 230 may include an infrared ray blocking filter 234 for filtering infrared rays input from the lens module 220.

The camera module 200, according to the present embodiment, may provide an autofocus (AF) function and an optical image stabilization (OIS) function.

While the lens module 220 moves back and forth along the optical axis, a focal distance may be adjusted. A focus adjustment driver may be disposed on the lateral side of the lens module 220. A focus adjustment magnet 226a is mounted on the lens module 220, and a focus adjustment coil 226c may be disposed on a position that faces the focus adjustment magnet 226a. The lens module 220 may move along the optical axis by electromagnetic interaction between the focus adjustment coil 226c and the focus adjustment magnet 226a. The focus adjustment coil 226c is installed in the substrate 205 attached to the housing 201, and the housing 201 may have an opening 206 so that the focus adjustment coil 226c may face the focus adjustment magnet 226a.

When the lens module 220 moves, upper rolling portions 251, 252, 253, and 254 and lower rolling portions 261, 262, 263, and 264 may be formed on the housing 201 and the lens module 220 so as to reduce friction between the lens module 220 and the housing 201. That is, the upper rolling portions 251, 252, 253, and 254 may be formed on an internal upper side of the housing 201, the lower rolling portions 261, 262, 263, and 264 may be formed on an external lower side of the lens module 220, and the upper rolling portions 251, 252, 253, and 254 may be disposed to correspond to the lower rolling portions 261, 262, 263, and 264.

A rolling member 223 may be disposed between the upper rolling portions 251, 252, 253, and 254 and the lower rolling portions 261, 262, 263, and 264 to guide the movement of the lens module 220 in the optical-axis direction. The rolling member 223 may, for example, have a ball shape.

The folded module 210 rotates with respect to an axis that is perpendicular to the optical axis, thereby realizing the optical image stabilization (OIS) function.

For example, when the optical axis is set to be a first axis, the first axis is parallel to the z-axis in the drawing, a second axis is perpendicular to the optical axis and parallel to incident light and is parallel to the y-axis in the drawing, and a third axis is perpendicular to the optical axis and the second axis and may be parallel to the x-axis in the drawing.

The folded module 210 may include a stabilization driver for rotating the reflective member 211 with respect to an axis that is perpendicular to the optical axis, for the housing 201. The stabilization driver may include a first stabilization driver for rotating the reflective member 211 with respect to the second axis that is perpendicular to the optical axis, and a second stabilization driver for rotating the same with respect to the third axis that is perpendicular to the optical axis and is orthogonal to the second axis.

As the stabilization driver rotates the reflective member 211 with respect to the second axis and/or the third axis, the shaking of the image falling to the image sensor 231 by the shaking of the camera module 200 may be optically corrected. For this purpose, the stabilization driver may generate a driving force so that the movable holder 212 may be rotatable with respect to two axes.

For example, the stabilization driver includes a plurality of stabilization magnets 116a and 117a and a plurality of stabilization coils 116c and 117c facing the same. When a power voltage is applied to the stabilization coils 116c and 117c, the movable holder 212 on which the stabilization magnets 116a and 117a are mounted may be rotated with respect to the second axis (y axis in the drawing) and the third axis (x axis in the drawing) by electromagnetic interaction between the stabilization magnets 116a and 117a and the stabilization coils 116c and 117c.

The stabilization magnets 116a and 117a are installed in the movable holder 212. For example, one 116a of the stabilization magnets 116a and 117a may be installed on a bottom surface of the movable holder 212, and the other 117a may be installed on a lateral side of the movable holder 212.

The stabilization coils 116c and 117c are mounted on the housing 201. For example, the stabilization coils 116c and 117c may be mounted in the housing 201 with the substrate 205 as a medium. That is, the stabilization coils 116c and 117c are installed on the substrate 205, and the substrate 205 is mounted in the housing 201. Here, the substrate 205 is provided as an integral body so that a coil for the folded module 210 and a coil for the lens module 220 may be mounted thereon in the drawing, and the substrate 205 may be provided as at least two substrates so that the coil for the folded module 210 and the coil for the lens module 220 may be installed.

Figure 14:
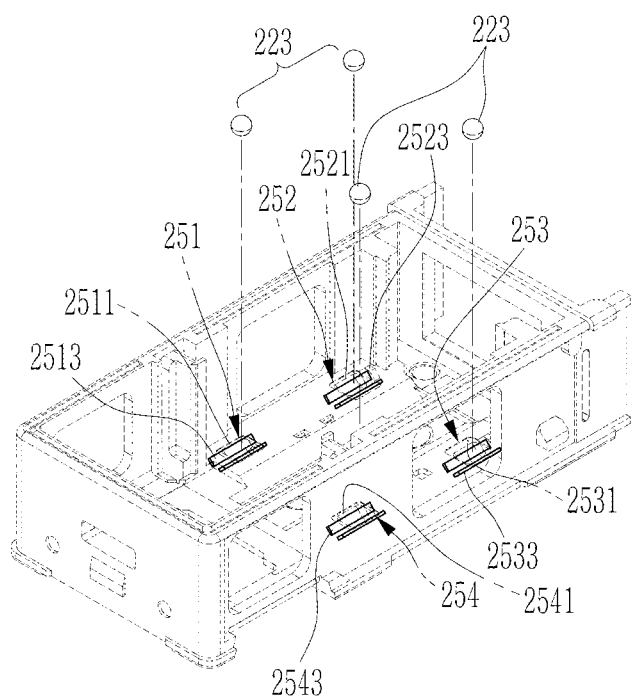
FIG. 14 shows a perspective view of a housing of a camera module shown in FIG. 13.
Figure 15:
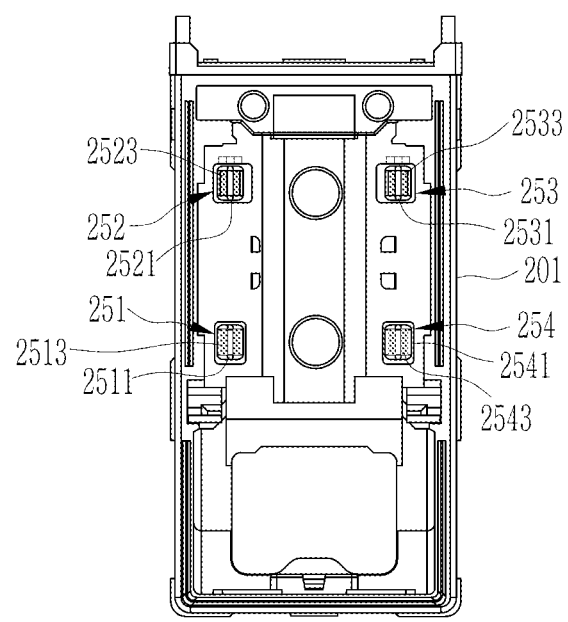
FIG. 15 shows a top plan view of a housing shown in FIG. 14.

FIG. 14 shows a perspective view of a housing of a camera module shown in FIG. 13, and FIG. 15 shows a top plan view of a housing shown in FIG. 14.

Referring to FIG. 14 and FIG. 15, the housing 201 of the camera module 200, according to the present embodiment, may include upper rolling portions 251, 252, 253, and 254 formed on an inner upper side of the bottom side. Therefore, when seen in the planar direction, the upper rolling portions 251, 252, 253, and 254 may be disposed in pairs on respective sides of the optical axis (z-axis in the drawing), and the one pairs of upper rolling portions 251, 252, 253, and 254 disposed on the respective sides may be arranged in parallel in the optical-axis direction.

The upper rolling portions 251, 252, 253, and 254 may include guide grooves 2511, 2521, 2531, and 2541 formed on the outside of the mold forming the exterior of the housing 201. The guide grooves 2511, 2521, 2531, and 2541 may extend in the optical-axis direction, may receive the rolling member 223, and may guide the motion of the rolling member 223 in the optical-axis direction.

The upper rolling portions 251, 252, 253, and 254 may include reinforcing inserts 2513, 2523, 2533, and 2543 including a plurality of rails spaced from each other in the guide grooves 2511, 2521, 2531, and 2541. The reinforcing inserts 2513, 2523, 2533, and 2543 may be made of a material that has greater strength than the mold, for example, the mold may be made of a resin material and the reinforcing insert may be made of a metallic material.

A plurality of rails of the reinforcing inserts 2513, 2523, 2533, and 2543 may extend in parallel to each other in the optical-axis direction in the guide grooves 2511, 2521, 2531, and 2541, and may be exposed in the guide grooves 2511, 2521, 2531, and 2541. The guide grooves 2511, 2521, 2531, and 2541 may include a pair of rolling sides facing each other with a predetermined angle, and the respective rails may be distributed on the one pair of rolling sides.

Hence, the rolling member 223 in a ball shape contacts a plurality of rails of the reinforcing inserts 2513, 2523, 2533, and 2543 and rolls along the same in the guide grooves 2511, 2521, 2531, and 2541 of the upper rolling portions 251, 252, 253, and 254. The rolling member 223 may be made of a metal ball, and as it faces the reinforcing inserts 2513, 2523, 2533, and 2543 of a metallic material and contacts the same in the guide grooves 2511, 2521, 2531, and 2541, the imprinting phenomenon of the guide grooves 2511, 2521, 2531, and 2541 by the rolling member 223 may be prevented.

Figure 16:
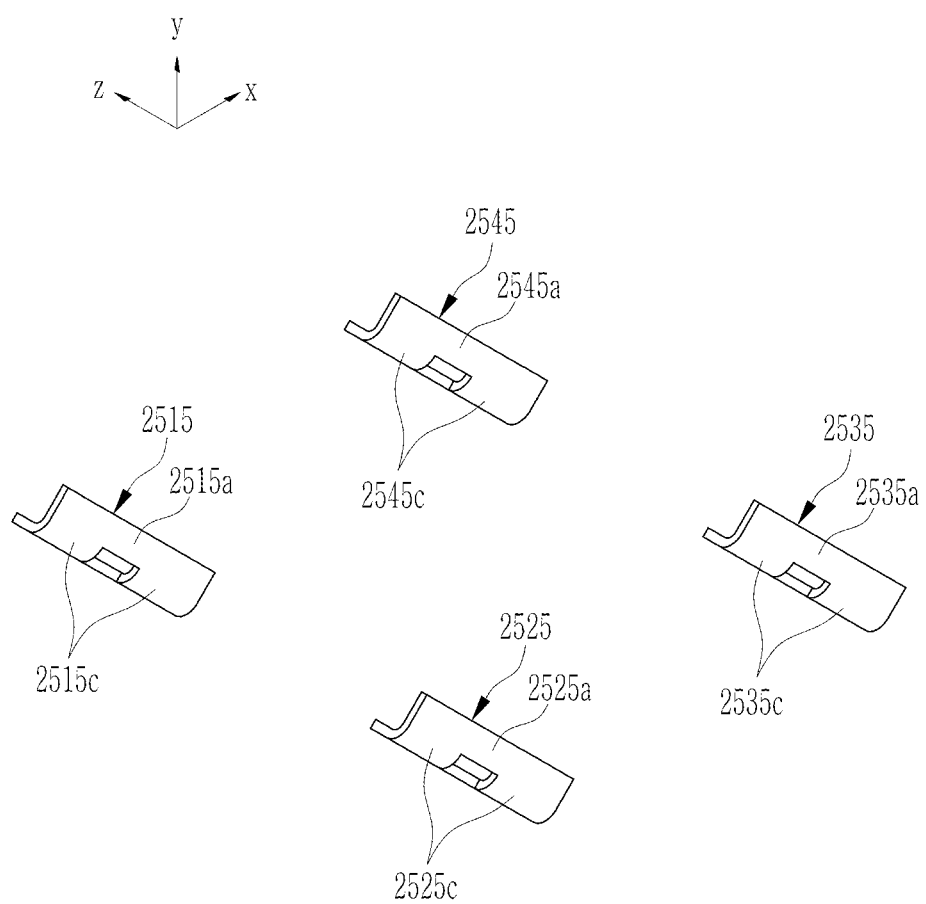
FIG. 16 shows a low-side perspective view of a reinforcing insert according to another variation of a ball rolling portion applied to a housing of a camera module shown in FIG. 13.

FIG. 16 shows a low-side perspective view of a reinforcing insert according to another variation of a ball rolling portion applied to a housing of a camera module shown in FIG. 13.

Referring to FIG. 16, the reinforcing inserts 2515, 2525, 2535, and 2545 according to the present variation, may include a plurality of rails 2515a, 2525a, 2535a, and 2545a extending in parallel to each other, and may include connectors 2515c, 2525c, 2535c, and 2545c for connecting the rails 2515a, 2525a, 2535a, and 2545a to each other. The connectors 2515c, 2525c, 2535c, and 2545c may be multiple, and they may be spaced from each other at respective ends of the elongation direction (z-axis direction in the drawing) of the rails 2515a, 2525a, 2535a, and 2545a. The connectors 2515a, 2525c, 2535c, and 2545a may be inserted into the mold of the housing 201 and may be bent along curves of the guide grooves 2511, 2521, 2531, and 2541.

Figure 17:
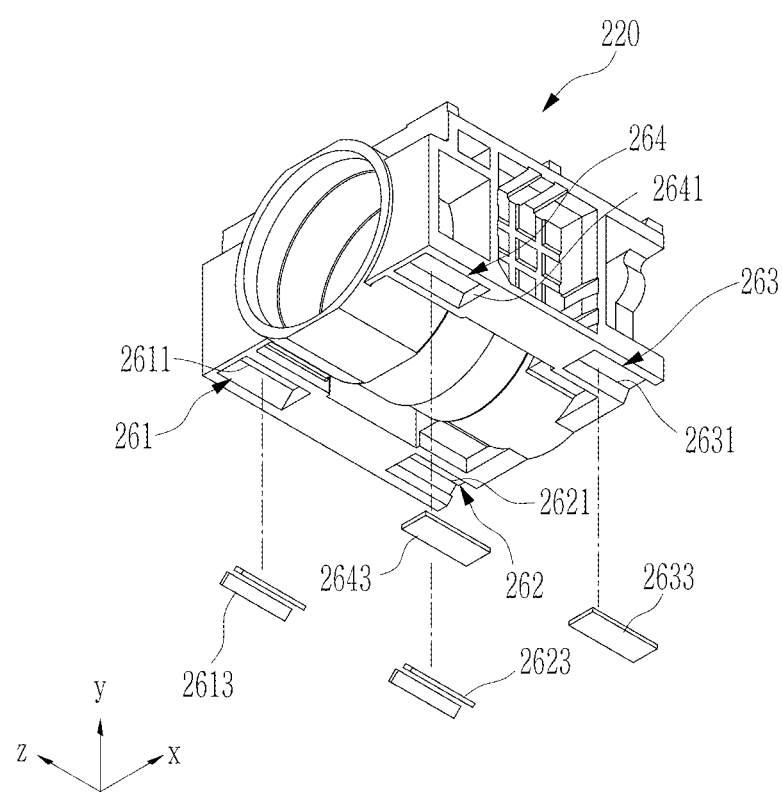
FIG. 17 shows a low-side perspective view of a lens barrel of a camera module shown in FIG. 13.

FIG. 17 shows a low-side perspective view of a lens barrel of a camera module shown in FIG. 13.

Referring to FIG. 17, the lens module 220 of the camera module 200, according to the present embodiment, may include lower rolling portions 261, 262, 263, and 264 formed on an external lower side. When viewed from the planar direction, the lower surface rolling portions 261, 262, 263, and 264 may be arranged in pairs on both sides about the optical axis (the z axis in the drawing), and a pair of lower surface rolling portions 261, 262, 263, and 264 disposed on each side may be aligned in parallel along the optical axis direction.

The lower rolling portions 261, 262, 263, and 264 may include guide grooves 2611, 2621, 2631, and 2641 formed on the outside of the mold forming the exterior of the lens module 220. The guide grooves 2611, 2621, 2631, and 2641 may extend in the optical-axis direction, may receive the rolling member 223, and may guide the motion of the rolling member 223 in the optical-axis direction.

The lower rolling portions 261, 262, 263, and 264 may include reinforcing inserts 2613 and 2623 including a plurality of rails spaced from each other in at least one of the guide grooves 2611 and 2621. The lower rolling portions 261, 262, 263, and 264 may include reinforcing inserts 2633 and 2643 including a single planar rail in the other of the guide grooves 2631 and 2641.

For example, the reinforcing inserts 2613 and 2623 having a plurality of rails may be disposed on the two lower rolling portions 261 and 262 positioned on one side of the optical axis, and the reinforcing inserts 2633 and 2643 having a single planar rail may be disposed on the two lower rolling portions 263 and 264 positioned on the other side of the optical axis, and formation positions and numbers are not limited thereto. That is, combination of the numbers and the disposal of the reinforcing inserts with a plurality of rails and the reinforcing insert with a single planar rail may be variable depending on characteristics required to the camera module, which also belongs to the scope of the present claims.

The reinforcing inserts 2613, 2623, 2633, and 2643 may be made of a material that has greater strength than the mold, for example, the mold may be made of a resin material and the reinforcing insert may be made of a metallic material.

The rails of the reinforcing inserts 2613 and 2623 may extend in parallel to each other in the optical-axis direction in the guide grooves 2611 and 2621, and may be exposed in the guide grooves 2611 and 2621. The guide grooves 2611 and 2621 may include a pair of rolling sides facing each other with a predetermined angle, and a plurality of rails may be distributed on the one pair of rolling sides. The single planar rails of the reinforcing inserts 2633 and 2643 may respectively extend in the optical-axis direction in the guide grooves 2631 and 2641 and may be exposed in the guide grooves 2631 and 2641. The rolling member 223 in a ball shape may contact a plurality of rails of the reinforcing inserts 2613 and 2623 and move along the same in the guide grooves 2611 and 2621 of the lower rolling portions 261 and 262. The rolling member 223 may be made of a metal ball, and as it faces the reinforcing inserts 2613 and 2623 of a metallic material and contacts the same in the guide grooves 2611 and 2621, the imprinting phenomenon of the guide grooves 2611 and 2621 by the rolling member 223 may be prevented.

Figure 18:
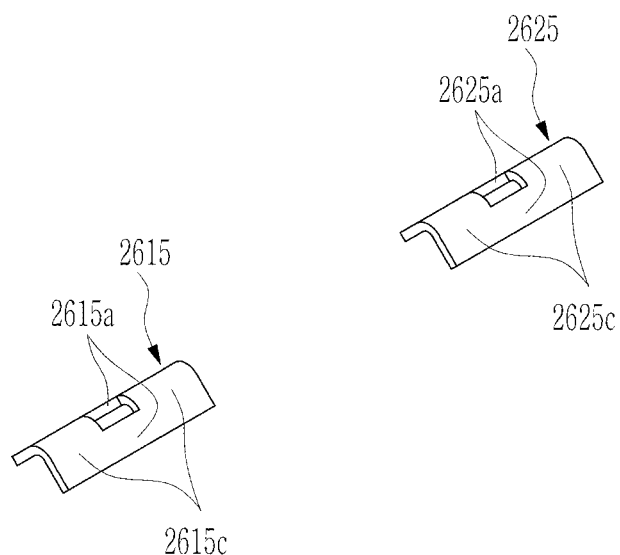
FIG. 18 shows a perspective view of a reinforcing insert according to another variation of a rolling portion applied to a lens barrel of a camera module shown in FIG. 13.

FIG. 18 shows a perspective view of a reinforcing insert according to another variation of a rolling portion applied to a lens barrel of a camera module shown in FIG. 13.

Referring to FIG. 18, the reinforcing inserts 2615 and 2625, according to the present variation, may include a plurality of rails 2615a and 2625a extending in parallel to each other, and may include connectors 2615c and 2625c for connecting the rails 2615a and 2625a to each other. The connectors 2615c and 2625c may be multiple, and may be spaced from each other at the respective ends of the rails 2615a and 2625a in the elongation direction. The connectors 2615c and 2625c may be inserted into the mold of the lens module 220 and may be bent along curves of the guide grooves 2611 and 2621.

Figure 19:
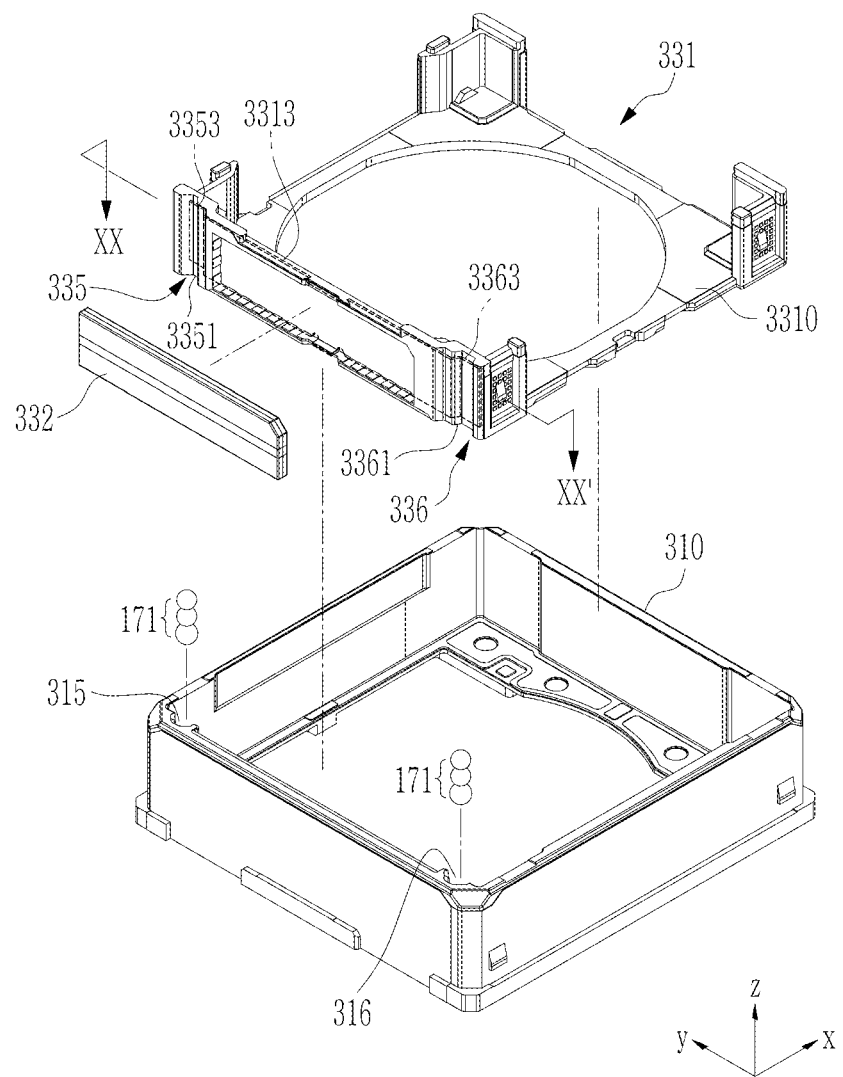
FIG. 19 shows a perspective view of a carrier and a housing of a camera module according to another embodiment.
Figure 20:
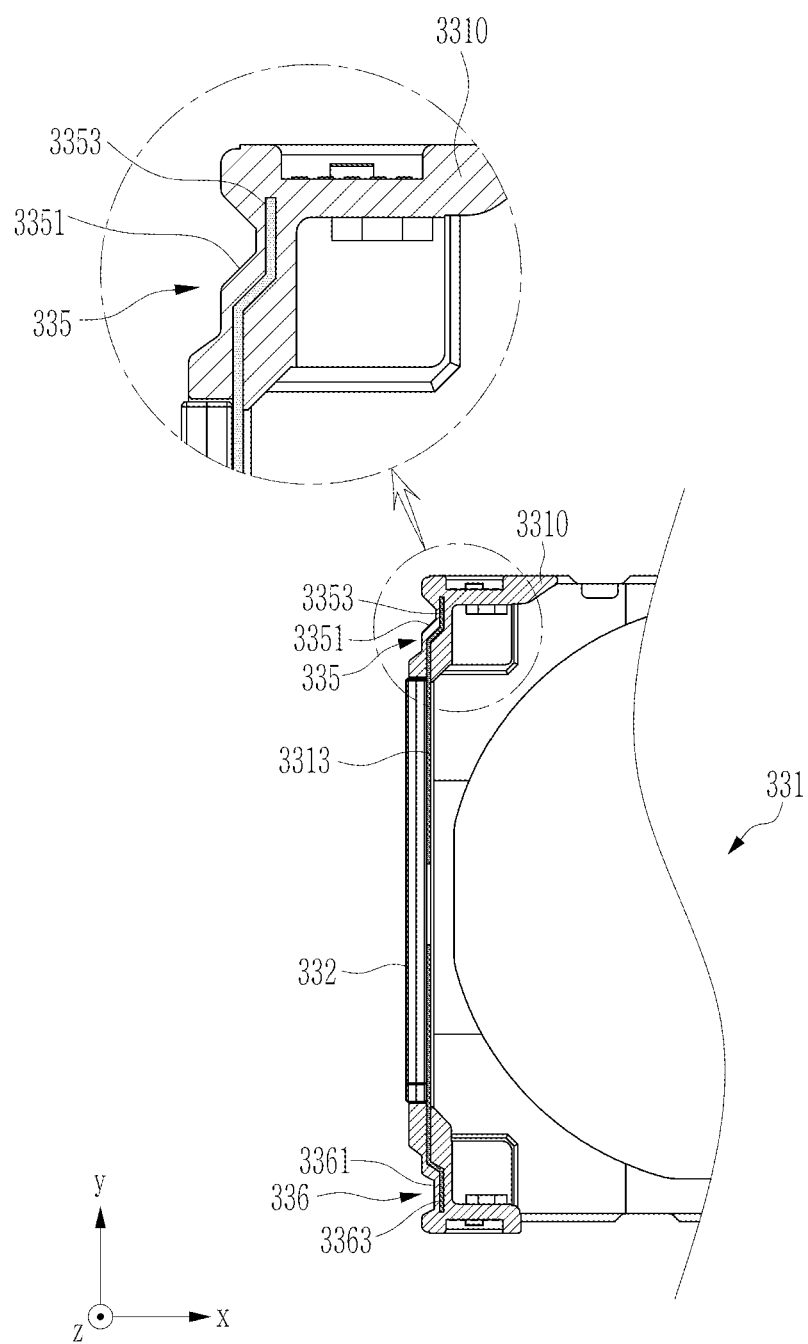
FIG. 20 shows a partial cross-sectional view of a carrier shown in FIG. 19 with respect to a line XX-XX'.

FIG. 19 shows a perspective view of a carrier and a housing of a camera module according to another embodiment, and FIG. 20 shows a partial cross-sectional view of a carrier shown in FIG. 19 with respect to a line XX-XX'.

Referring to FIG. 19, the housing 310 of the camera module, according to the present embodiment, may include internal rolling portions 315 and 316 formed on an internal side of one side wall. One pair of the internal rolling portions 315 and 316 may be disposed on respective sides of the center of the width direction (y-axis direction) of the one side wall. The one side wall may be a side wall of the housing 310 on which the focus adjustment magnet 332 is disposed.

The carrier 331 of the camera module may include external rolling portions 335 and 336 formed on the exterior side of one side wall. A pair of the external rolling portions 335 and 336 may be disposed on both sides based on the center of the width direction (y-axis direction) of the one side wall. The one side wall may be a side wall of the carrier 331 on which the focus adjustment magnet 332 is disposed.

The external rolling portions 335 and 336 may include guide grooves 3351 and 3361 formed on the outside of the mold 3310 forming the exterior of the carrier 331. The guide grooves 3351 and 3361 may extend in the optical-axis direction (z-axis direction), may receive the rolling member 171, and may guide the motion of the rolling member 171 in the optical-axis direction.

The external rolling portions 335 and 336 disposed on the carrier 331 may include a first external rolling portion 335, which the rolling member 171 in a ball shape contacts at two points in the guide groove 3351, and a second external rolling portion 336, which the same contacts at one point in the guide groove 3361. That is, the guide groove 3351 of the first external rolling portion 335 may include a pair of V-type rolling sides facing each other with a predetermined angle and respectively contacting the rolling member 171, and the guide groove 3361 of the second external rolling portion 336 may include a planar rolling side contacting the rolling member 171.

A yoke 3313 may be disposed on one side wall of the carrier 331 on which the external rolling portions 335 and 336 are disposed. The yoke 3313 may extend along the one side wall perpendicular to the optical axis and may be installed in the mold 3310. The yoke 3313 is made of a magnetic material, and it may generate gravitation between the focus adjustment magnet 332 disposed on the outside of the mold 3310 of the carrier 331 so that the focus adjustment magnet 332 may be firmly fixed to the carrier 331.

The external rolling portions 335 and 336 may include reinforcing inserts 3353 and 3363 completely installed in the mold 3310 so as to correspond to the guide grooves 3351 and 3361. The reinforcing inserts 3353 and 3363 may be made of a material that has greater strength than the mold 3310, for example, the mold 3310 may be made of a resin material and the reinforcing inserts 3353 and 3363 may be made of a metallic material.

The reinforcing inserts 3353 and 3363 may integrally extend from the respective ends of the yoke 3313. The respective reinforcing inserts 3353 and 3363 may be bent along transectional shapes of the guide grooves 3351 and 3361 incised with respect to the plane that is perpendicular to the optical axis from the respective ends of the yoke 3313. Therefore, the reinforcing inserts 3353 and 3363 may be moved toward the inside of the carrier 331 becoming distant from the guide grooves 3351 and 3361 with respect to a primary side of the yoke 3313.

Figure 21:
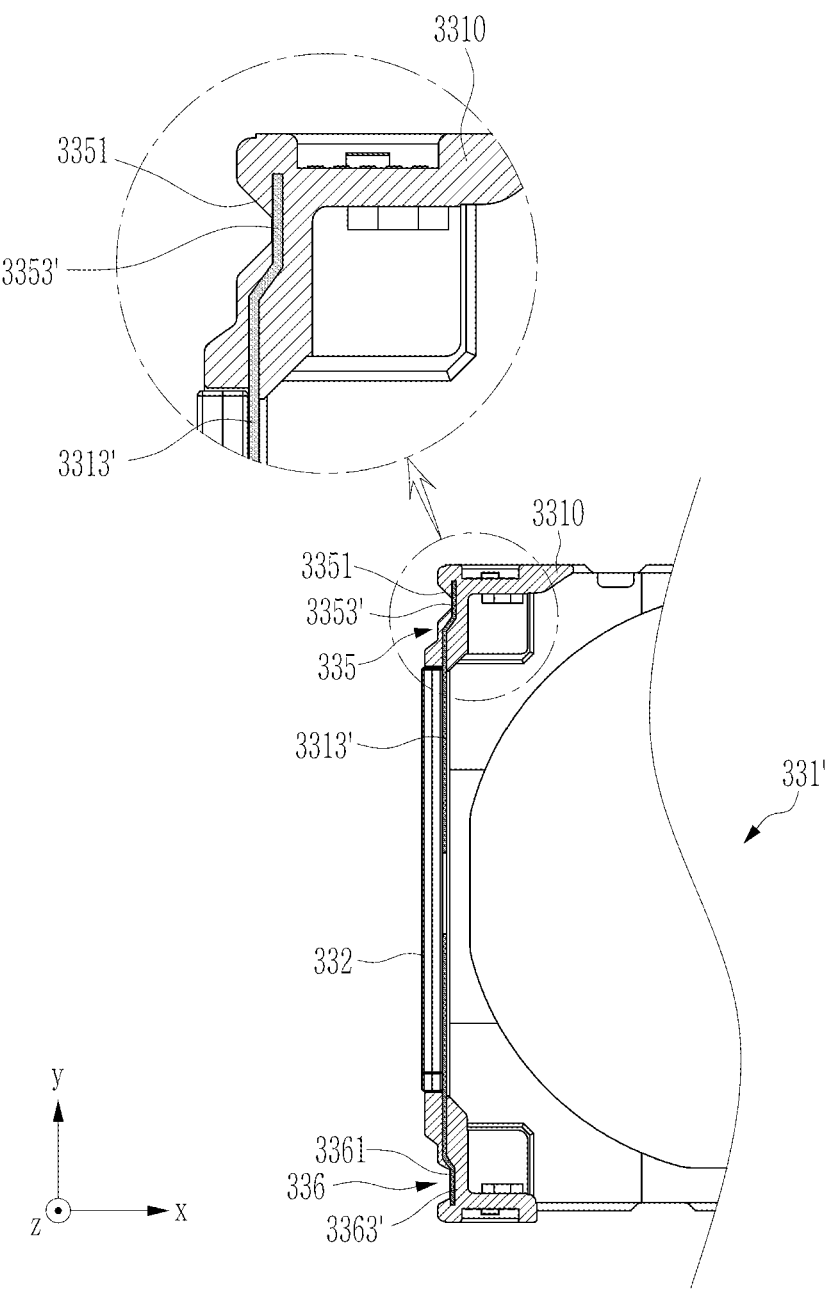
FIG. 21 shows a partial cross-sectional view of another variation of a carrier shown in FIG. 19.

FIG. 21 shows a partial cross-sectional view of another variation of a carrier shown in FIG. 19.

Referring to FIG. 21, regarding the carrier 331' according to the variation, the reinforcing inserts 3353' and 3363' may be disposed to be partially exposed in the guide grooves 3351 and 3361. That is, the reinforcing inserts 3353' and 3363' integrally extending from an end of the yoke 3313' are mostly installed in the mold 3310 together with the yoke 3313, and one of the sides thereof may be exposed on the bottom sides of the guide grooves 3351 and 3361. The exposed one sides of the reinforcing inserts 3353' and 3363' may directly contact the rolling member 171 in a ball shape.

Figure 22:
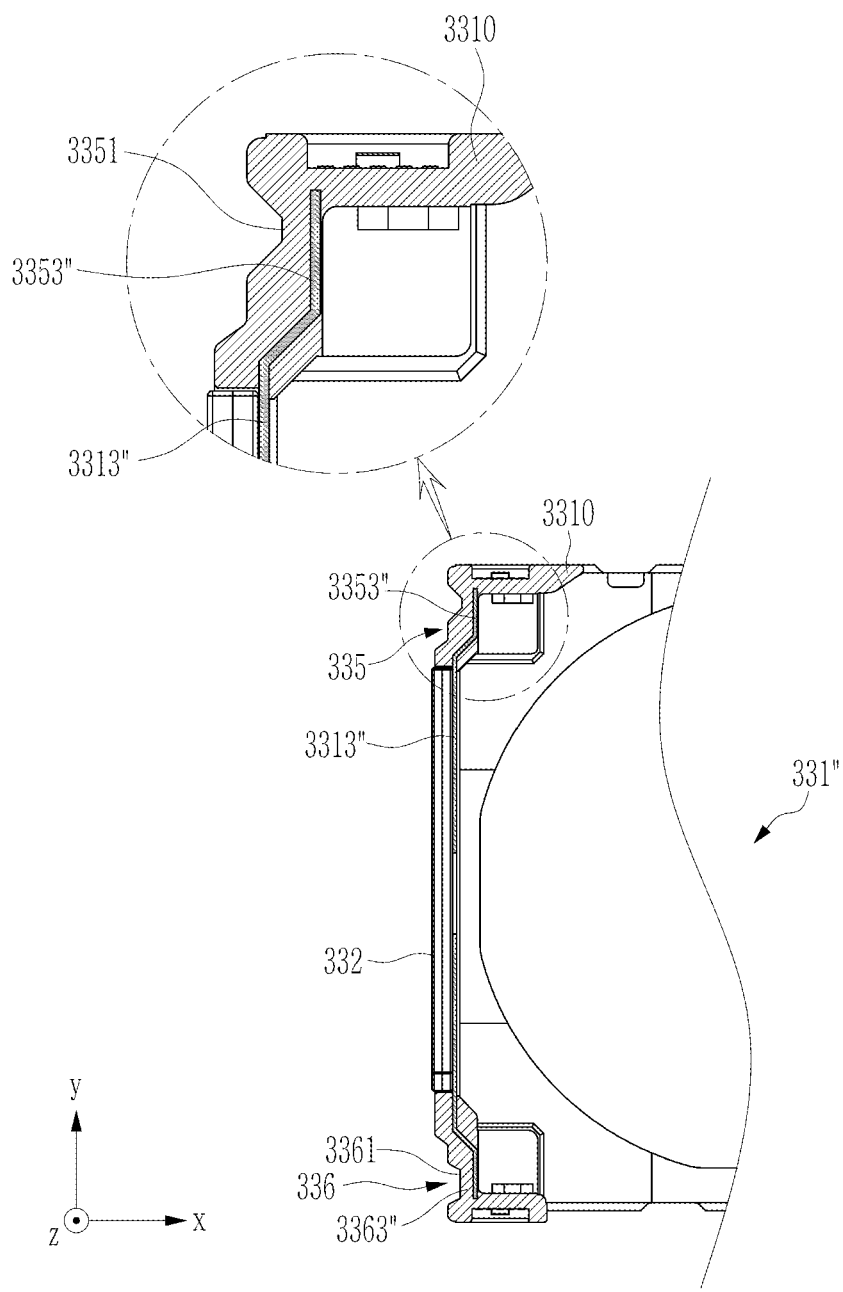
FIG. 22 shows a partial cross-sectional view of a still another variation of a carrier shown in FIG. 19.

FIG. 22 shows a partial cross-sectional view of a still another variation of a carrier shown in FIG. 19.

Referring to FIG. 22, regarding the carrier 331" according to the variation, the reinforcing inserts 3353" and 3363" may be partially exposed to the inside of a wall body of the mold 3310. That is, the reinforcing inserts 3353" and 3363" integrally extending from an end of the yoke 3313" are mostly installed in the mold 3310 together with the yoke 3313", and are bent to the inside of the wall body of the mold 3310 in a region that corresponds to the guide grooves 3351 and 3361, and one of the sides thereof may be exposed.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A camera module comprising:
   a housing having an internal space covered by a cover, and an internal rolling portion on an internal side;
   a carrier, disposed in the internal space of the housing, configured to receive a lens barrel, and having an external rolling portion corresponding to the internal rolling portion on an exterior side;
   a focus adjustment driver configured to generate a driving force to move the carrier in an optical-axis direction in the housing; and
   a rolling member disposed between the internal rolling portion and the external rolling portion,
   wherein either one or both of the internal rolling portion and the external rolling portion includes
   a guide groove, formed on an external surface of a mold forming an exterior of the housing or the carrier, including a pair of rolling sides facing each other with a predetermined angle, and
   a reinforcing insert made of a material having greater strength than a material of the mold and formed to have a plurality of rails spaced from each other and distributed on the one pair of rolling sides in the guide groove.

2. The camera module of claim 1, wherein
the material of the mold is a resin material, and the material of the reinforcing insert is a metallic material.
3. The camera module of claim 1, wherein
the rails extend in parallel to each other in the optical-axis direction in the guide groove.
4. The camera module of claim 1, wherein
the rails are exposed in the guide groove.
5. The camera module of claim 1, wherein
the reinforcing insert includes a connector for connecting the rails to each other.
6. The camera module of claim 5, wherein
the connector is configured to insert into the mold of the housing or a mold of the carrier and is bent along a curve of the guide groove.
7. The camera module of claim 1, wherein
the reinforcing insert further includes a bridge bent to intersect the optical-axis direction from at least one end of the rails.
8. The camera module of claim 1, wherein
the reinforcing insert further includes a protrusion configured to protrude from the rails to a lateral side and insert into the mold of the carrier.
9. A camera module comprising:
a housing having an internal space covered by a cover, and an upper rolling portion on an internal upper side;
a folded module including a reflective member configured to change a path of incident light by reflection;
a lens module, disposed in the internal space of the housing, including a plurality of lenses arranged in an optical-axis direction to allow light reflected at the reflective member to pass therethrough, and including a lens barrel having a lower rolling portion corresponding to the upper rolling portion on an external lower side;
a focus adjustment driver configured to generate a driving force to move the lens module in the optical-axis direction in the housing; and
a rolling member disposed between the upper rolling portion and the lower rolling portion,
wherein either one or both of the upper rolling portion and the lower rolling portion includes
a guide groove, formed on an external side of a mold forming an exterior of the housing or the lens module, including a pair of rolling sides facing each other with a predetermined angle, and
a reinforcing insert made of a material having greater strength than a material of the mold and including a plurality of rails spaced from each other and distributed on the one pair of rolling sides in the guide groove.

10. The camera module of claim 9, wherein
the material of the mold is a resin material, and the material of the reinforcing insert is a metallic material.
11. The camera module of claim 9, wherein
the rails extend in parallel to each other in the optical-axis direction in the guide groove.
12. The camera module of claim 9, wherein
the rails are exposed in the guide groove.
13. The camera module of claim 9, wherein
the reinforcing insert includes a connector configured to connect the rails to each other on at least one end.
14. The camera module of claim 13, wherein
the connector is configured to insert into the mold of the housing or a mold of the lens module and is bent along a curve of the guide groove.
15. A camera module comprising:
a housing having an internal space covered by a cover, and an internal rolling portion on an internal side;
a carrier disposed in an internal space of the housing, configured to receive a lens barrel, and having an external rolling portion that corresponds to the internal rolling portion on an exterior side;
a focus adjustment driver configured to generate a driving force to move the carrier in an optical-axis direction in the housing;
a rolling member disposed between the internal rolling portion and the external rolling portion; and
a yoke disposed on one side wall of the carrier on which the external rolling portion is disposed, extending along the one side wall in a direction perpendicular to the optical axis and installed in the mold,
wherein the external rolling portion includes a guide groove formed on an external surface of a mold forming an exterior of the carrier, and a reinforcing insert made of a material having greater strength than a material of the mold, and
the external rolling portion is installed in the mold to correspond to the guide groove.
16. The camera module of claim 15, wherein
the material of the mold is a resin material, and the material of the reinforcing insert is a metallic material.
17. The camera module of claim 15,
wherein the reinforcing insert integrally extends from at least one end of the yoke.
18. The camera module of claim 17, wherein
the reinforcing insert is bent along a transactional contour of the guide groove incised with respect to a plane perpendicular to the optical axis from the at least one end of the yoke.

* * * * *